(12) United States Patent
Henry et al.

(10) Patent No.: US 7,675,913 B2
(45) Date of Patent: Mar. 9, 2010

(54) PORT ADDRESSING METHOD AND APPARATUS FOR LINK LAYER INTERFACE

(75) Inventors: Algernon P. Henry, Breinigsville, PA (US); Shaun P. Whalen, Wescosville, PA (US); Harold J. Wilson, Center Valley, PA (US)

(73) Assignee: Agere Systems Inc., Allentown, PA (US)

( * ) Notice: Subject to any disclaimer, the term of this patent is extended or adjusted under 35 U.S.C. 154(b) by 703 days.

(21) Appl. No.: 11/466,858

(22) Filed: Aug. 24, 2006

(65) Prior Publication Data

US 2008/0123657 A1 May 29, 2008

(51) Int. Cl.
*H04L 12/56* (2006.01)
*H04J 3/16* (2006.01)

(52) U.S. Cl. ...................... 370/392; 370/471
(58) Field of Classification Search ........................ None
See application file for complete search history.

(56) References Cited

U.S. PATENT DOCUMENTS

| | | | | |
|---|---|---|---|---|
| 6,661,787 B1 * | 12/2003 | O'Connell et al. | .......... | 370/389 |
| 6,671,758 B1 * | 12/2003 | Cam et al. | .................. | 710/100 |
| 6,788,700 B1 * | 9/2004 | Nakil | .......................... | 370/419 |
| 7,336,660 B2 * | 2/2008 | Pullela | ....................... | 370/392 |
| 2002/0031141 A1 * | 3/2002 | McWilliams | ................ | 370/463 |
| 2002/0083190 A1 * | 6/2002 | Kamiya et al. | .............. | 709/236 |
| 2003/0081624 A1 * | 5/2003 | Aggarwal et al. | ........... | 370/412 |
| 2004/0202170 A1 * | 10/2004 | Parchak et al. | ........... | 370/395.1 |
| 2005/0005021 A1 | 1/2005 | Grant et al. | | |
| 2005/0041584 A1 * | 2/2005 | Lau et al. | .................... | 370/235 |
| 2005/0138259 A1 * | 6/2005 | Khan et al. | ................. | 710/305 |
| 2005/0169298 A1 | 8/2005 | Khan et al. | | |
| 2007/0268903 A1 * | 11/2007 | Nakagawa | .................. | 370/392 |

OTHER PUBLICATIONS

Agere Systems, Product Brief, "Edge/Access and Multiservice Network Processors: APP550 and APP530," pp. 1-4, May 2003.
Implementation Agreement OIF-SPI3-01.0, "System Packet Interface Level 3 (SPI-3): OC-48 System Interface for Physical and Link Layer Devices," Optical Internetworking Forum, pp. 1-42, 2001.
PMC-Sierra, Inc. "Packet Over Sonet, Implementing Packet Based SONET/SDH Links," White Paper, PMC-971161, Issue 1, 19 pages, downloaded from www.pmc-sierra.com/pdf/whitePaper-packetOverSonet.pdf on Aug. 23, 2006.
PMC-Sierra, Inc. "Saturn Compatible Packet Over Sonet Interface Specification for Physical Layer Devices," POS-PHY™, Level 2, PMC-971147, Issue 5, 41 pages, Dec. 1998.

* cited by examiner

*Primary Examiner*—Chirag G Shah
*Assistant Examiner*—Amarnauth Persaud
(74) *Attorney, Agent, or Firm*—Ryan, Mason & Lewis, LLP

(57) ABSTRACT

A packet, cell or other data segment received in a physical layer device from a link layer device via an interface bus is processed to determine a port address for the data segment in the physical layer device. The port address, which may be an MPHY address, is determined using a combination of a first address value obtained from a link layer address portion of the data segment and a second address value obtained from a payload portion of the data segment. The data segment is stored in a memory location identified by the port address. The memory location may comprise a particular queue of the physical layer device.

23 Claims, 2 Drawing Sheets

| SIB 2-BYTE PREPEND FORMAT | |
|---|---|
| OCTET (IN ORDER OF APPEARANCE ON LINK LAYER BUS) | [7:0] |
| 0 | [7] – IN-BAND MESSAGE ENABLE<br>[6:3] – CLASS (IF MULTI-CLASS PPP) ELSE RESERVED<br>[2:0] – PREPEND MPHY [10:8] |
| 1 | [7:0] – PREPEND MPHY [7:0] |

PORT ADDRESSING METHOD AND APPARATUS FOR LINK LAYER INTERFACE

FIELD OF THE INVENTION

The present invention relates generally to communication devices for use in network-based communication systems, and more particularly to port addressing techniques for use in an interface between a physical layer device and a link layer device.

BACKGROUND OF THE INVENTION

Current and emerging networks move increasingly diverse traffic types. Such traffic types are also referred to herein as services. In the past, network equipment was dominated by a few traffic types such as time division multiplexed (TDM) or asynchronous transfer mode (ATM). As network applications have expanded, new traffic types such as Internet protocol (IP) must be supported, particularly for equipment at the edge of the network. Since legacy services are still present, networks need to handle multiple services. Such an environment requires multiservice network equipment. It is desirable for cost and other reasons to implement multiservice equipment with devices that can handle multiple services as opposed to using a dedicated device for each service. This multiservice environment therefore requires physical layer and link layer devices that can process multiple services.

A network processor is one example of what is more generally referred to herein as a link layer device, where the term "link layer" generally denotes a switching function layer, also referred to as the data link layer in the well-known Open Systems Interconnection (OSI) model. Network processors and other link layer devices are commonly used to implement processing associated with various packet-based and cell-based protocols, such as, for example, IP and ATM.

Communication between a physical layer device and a network processor or other type of link layer device may be implemented in accordance with an interface standard, such as the SPI-3 interface standard described in Implementation Agreement OIF-SPI3-01.0, "System Packet Interface Level 3 (SPI-3): OC-48 System Interface for Physical and Link Layer Devices," Optical Internetworking Forum, 2001, which is incorporated by reference herein. Another example of a known interface standard is the POS-2 standard described in POS-PHY Saturn Compatible Packet Over SONET Interface Specification for Physical Layer Devices, PMC-Sierra, Inc., PMC-971147, Issue 5, 1998, also incorporated by reference herein.

A given physical layer device may comprise a multiple-port device which communicates over multiple channels with the link layer device. Such communication channels, also commonly known as MPHYs, may be viewed as examples of what are more generally referred to herein as physical layer device ports. A given set of MPHYs that are coupled to a link layer device may comprise multiple ports associated with a single physical layer device, multiple ports each associated with one of a plurality of different physical layer devices, or combinations of such arrangements. As is well known, a link layer device may be advantageously configured to detect backpressure for a particular MPHY via polling of the corresponding MPHY address on its associated physical layer device. The detected backpressure is used by the link layer device to provide flow control and other traffic management functions, thereby improving link utilization.

The above-noted interface standards generally specify techniques for addressing an MPHY and for moving payload data over the interface. The addressing may use the same or separate pins from the payload. For the 8-bit mode of the SPI-3 standard, the MPHY address uses eight payload pins and thus the maximum number of MPHYs that can be specified is $2^8=256$. This maximum is based on the bus width of the 8-bit SPI-3 mode and cannot be increased without breaking compliance with this mode. For the POS-2 standard, the MPHY address uses pins separate from the payload, and the maximum number of MPHYs that can be specified is 31. There are well-known extensions to the POS-2 standard that increase the maximum number of MPHYs in increments of 31 by using additional pins. However, the number of pins becomes unmanageable when the MPHY number is scaled to 1024 or more, although such a number of MPHYs is readily achievable in physical layer devices using current integrated circuit technology.

It may also be desirable to exchange non-payload information other than an MPHY address between the physical layer device and the link layer device. Such other information may be transmitted using so-called "in-band" techniques so as to avoid significantly reducing the bandwidth allocated to true payload traffic.

The primary disadvantage of using the conventional SPI-3 or POS-2 standards is that the number of MPHYs that can be addressed without a significant increase in pins is much smaller than that which can now be achieved in physical layer devices. Increasing the number of pins increases package cost and power for both the link layer device and the physical layer device. Compatibility with the standards may also be compromised if additional pins are required. It is desirable to maintain compatibility with the standards so that both low MPHY count and high MPHY count applications may be supported with the same physical layer device.

It should be noted that a multiservice environment may impose other requirements in addition to support of a large number of MPHYs. For example, it may be desirable to allow the link layer device to start a low priority packet on one MPHY, then interrupt this packet to send a higher priority cell on a different MPHY, and then resume the lower priority packet without having to resend its addressing information. This is referred to as interleaving MPHYs, and is particularly useful in a multiservice application to control latency for cells. To support interleaving MPHYs, the physical layer device must save the MPHY address and other non-payload information for the low priority packet and restore it when the high priority cell ends. In general, this can be several bytes of state per MPHY, a significant amount of on-chip memory for devices with thousands of MPHYs. Storage of state per MPHY is not required if the physical layer device supports only non-interleaving MPHYs. For non-interleaving MPHYs, the interface can only switch to a different MPHY on a packet or cell boundary. Physical layer devices with a conventional flat MPHY numbering scheme must then trade off either high cost to store interleaving state or jeopardize services like ATM by imposing a potentially large and variable latency when sharing the physical layer device with an IP service.

A proprietary interface which is not compatible with the above-noted SPI-3 and POS-2 standards but supports a larger number of MPHYs is known as ANY-PHY. Various aspects of the ANY-PHY interface are described in U.S. Pat. No. 6,671, 758, assigned to PMC-Sierra, Inc. and entitled "Bus Interface for Cell and/or Packet Data Transfer." This interface uses two bytes of the payload for MPHY addressing. These bytes are referred to as prepend bytes, and support addressing of $2^{16}=65,536$ MPHYs. Although this approach easily supports 1024 or more MPHYs, it is not compliant with the SPI-3 and POS-2 standards, and uses a flat MPHY numbering scheme. Implementations may require a large amount of on-chip memory solely for the link layer interface. Due to the flat MPHY numbering scheme, ANY-PHY cannot group MPHYs according to service. In addition, a given implementation is likely to restrict interleaving to reduce the on-chip memory required to store interleave state for up to 65,536 MPHYs. For example, if an implementation of the ANY-PHY interface followed the recommendation of the SPI-3 standard, each of the 65,536 MPHYs would include 256 bytes of memory for a payload FIFO. This is a total of 16 Mbytes of memory for each direction of the interface, which would likely be considered too large for a cost-effective chip implementation, particularly if the chip is a non-DRAM chip. The required memory could be reduced by storing only minimal configuration and state information for each MPHY, but even with a modest four bytes per MPHY the interface would require 256 Kbytes of memory for each direction. Given these memory requirements, it is unlikely that any practical ANY-PHY implementation would attempt to support all 65,536 MPHYs.

Even with a smaller number of MPHYs, dedicating two bytes of the payload to MPHY addressing substantially reduces the bandwidth available to the actual payload. For example, when sending 53-byte ATM cells over an 8-bit ANY-PHY interface, the prepend bytes represent a 3.8% bandwidth penalty. Furthermore, since the prepend bytes carry only address information, other in-band information also subtracts from available payload bandwidth. For example, some packet protocols, such as Point-to-Point Protocol (PPP), require priority information (e.g., a 2 to 4 bit class) to be associated with each packet. For ANY-PHY, the packet class must be transferred as part of the payload. The ANY-PHY specification includes address pins separate from the payload pins as does the POS-2 standard. Unlike POS-2, ANY-PHY uses these separate address pins solely for polling the FIFO status whereas POS-2 uses them for both MPHY selection and polling. Thus, the ANY-PHY interface sacrifices additional bandwidth by duplicating the address information on the payload pins.

It is therefore apparent that a need exists for an improved interface between a physical layer device and a link layer device, which is able to support a large number of MPHYs in a multiservice environment while maintaining compliance with one or more standards and avoiding problems such as the above-described excessive memory requirements and bandwidth reduction.

SUMMARY OF THE INVENTION

The present invention meets the above-noted need by providing in a first aspect of the invention an improved port addressing technique.

In this aspect of the invention, a packet, cell or other data segment received in a physical layer device from a link layer device via an interface bus is processed to determine a port address for the data segment in the physical layer device. The interface bus may be part of an otherwise conventional standard interface, such as a SPI-3 or POS-2 interface. The port address, which may be an MPHY address, is determined using a combination of a first address value obtained from a link layer address portion of the data segment and a second address value obtained from a payload portion of the data segment. The data segment is stored in a memory location identified by the port address. The memory location may comprise, for example, a particular ingress or egress queue of the physical layer device.

An illustrative embodiment of the invention implements a lookup approach to determine egress queue information comprising a plurality of egress queue attributes. Such attributes may include, for example, a service-specific identifier and a base address of the memory location for storing the data segment.

The link layer address portion of the data segment may comprise, for example, a portion associated with designated pins of a SPI-3 interface, the designated pins being used to carry part of the payload portion of the data segment when not used to carry a link layer address.

As another example, the link layer address portion of the data segment may comprise a link layer address field of a POS-2 interface, the link layer address field being separate from the payload portion of the data segment.

In the above-noted illustrative embodiment, the payload portion of the data segment comprises one or more prepend bytes including a prepend MPHY field. The prepend MPHY field may comprise, for example, 11 bits of MPHY address information, so as to support addressing for up to 2048 different MPHYs.

In accordance with another aspect of the invention, the prepend bytes of the payload portion of the data segment may comprise in-band message information. For example, such in-band message information may comprise information identifying a service class for PPP or another designated communication protocol.

The above-noted first address value obtained from the link layer address portion of the data segment may comprise a first MPHY address value determined by using a link layer address as an index into a physical port lookup table to obtain an intermediate value, and using the resulting intermediate value as an index into a logical MPHY lookup table to obtain the first MPHY address value. The above-noted second address value obtained from the payload portion of the data segment may comprise a second MPHY address value that is extracted from the payload portion using a bit extractor. The port address may be determined by adding the first address value to the second address value and using the resulting combined address value as an index into a queue information lookup table.

Advantageously, the invention in the illustrative embodiments provides improved addressing of physical layer device ports in a communication system. A large number of ports can be supported, while maintaining compliance with one or more interface standards. Moreover, problems such as the above-noted excessive memory requirements and bandwidth reduction of the conventional ANY-PHY interface are avoided.

The illustrative embodiments are particularly advantageous in a multiservice environment. For example, multiple egress queues can be managed through a single physical port. More specifically, multiple egress queues can be managed for each of a plurality of services through respective ones of a plurality of ports, with numbering of the egress queues being independent of numbering of the ports. Thus, in a given embodiment, MPHYs of the physical layer device may be partitioned among multiple services on non-power-of-2 boundaries. Interleaving of MPHYs can thereby be supported in practical implementations without requiring storage of interleave state information for each of the MPHYs.

DETAILED DESCRIPTION OF THE INVENTION

The invention will be illustrated herein in conjunction with an exemplary network-based communication system which includes a link layer device, a physical layer device and other elements configured in a particular manner. It should be understood, however, that the invention is more generally applicable to any system in which it is desirable to provide improved port addressing as described herein.

The term "in-band" as used herein is intended to include, by way of example and without limitation, an arrangement in which additional information is transmitted utilizing an existing standard interface, such as an SPI-3, POS-2 or other similar interface, between a link layer device and a physical layer device, where the additional information is transferred as part of the payload but later dropped after being used for a particular purpose.

A "link layer device" or LLD as the term is used herein refers generally to a network processor or other type of processor which performs processing operations associated with a link layer of a network-based system. Such a device may be implemented, by way of example and without limitation, utilizing a microprocessor, central processing unit (CPU), digital signal processor (DSP), application-specific integrated circuit (ASIC), or other type of data processing device, as well as portions or combinations of these and other devices.

A "physical layer device" or PLD as the term is used herein refers generally to a device which provides an interface between a link layer device and a physical transmission medium of a network-based system.

Figure 1:
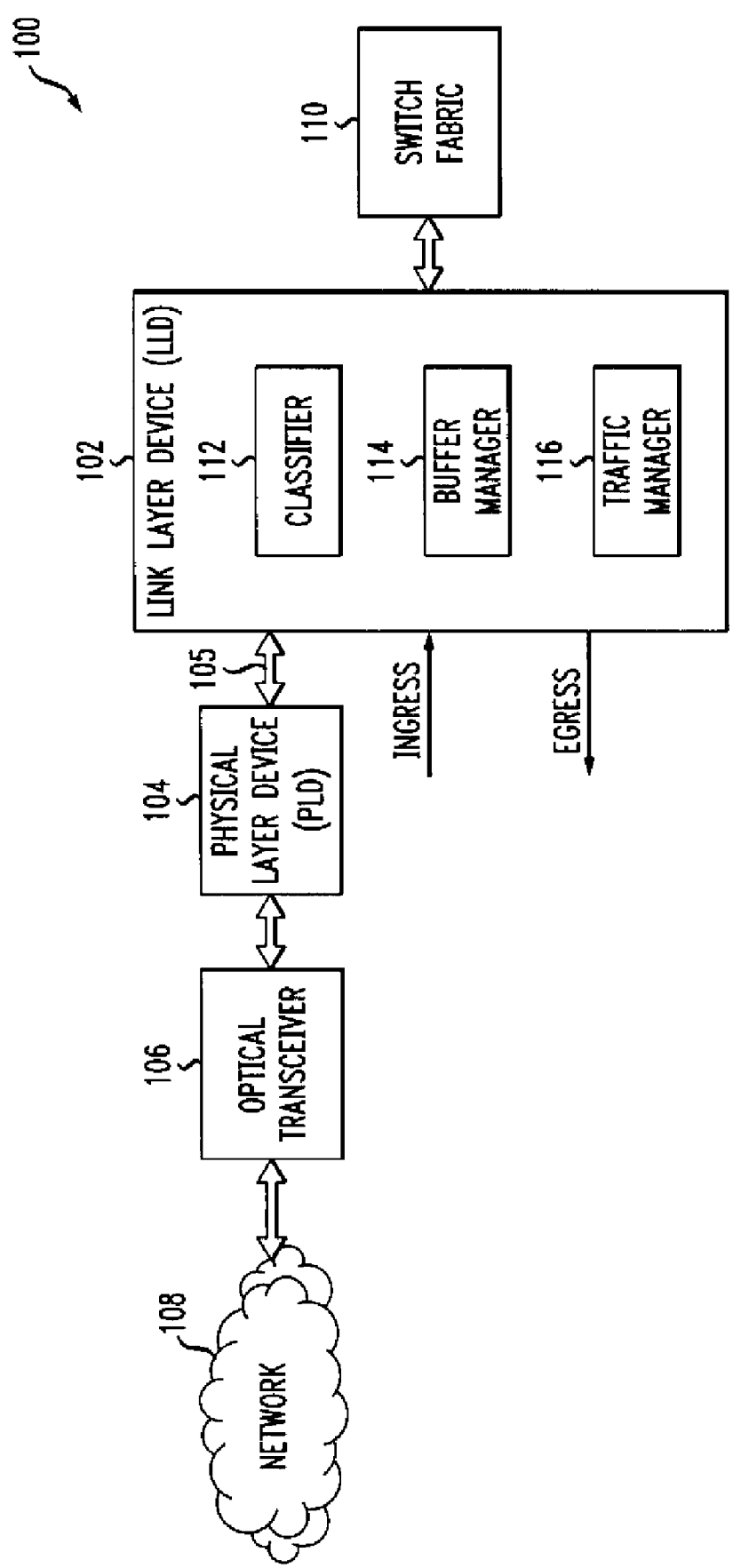
FIG. 1 is a simplified block diagram of a network-based communication system in accordance with an illustrative embodiment of the invention.

FIG. 1 shows a network-based communication system 100 in an illustrative embodiment of the invention. The system 100 includes a link layer device (LLD) 102 coupled to a physical layer device (PLD) 104 via an interface 105. The interface 105 is also referred to herein as a link layer interface, and may be configured as an otherwise conventional SPI-3, POS-2 or other similar interface, altered in a manner to be described below. The PLD 104 is coupled via an optical transceiver 106 to a network 108. The LLD 102 is coupled to a switch fabric 110. The LLD 102 is configured to communicate packets, cells or other protocol data units (PDUs) between the network 108 and the switch fabric 110 which controls switching of PDU data. A given LLD may, for example, include capabilities to move traffic for different services using different scheduling algorithms. The PLD 104 and optical transceiver 106 serve to interface the LLD to physical transmission media of the network 108, which are assumed in this case to comprise optical transmission media.

Packets, cells or other PDUs may be referred to herein as data segments. A given packet, cell or other PDU may also be comprised of multiple data segments. The term "data segment" as used herein is therefore intended to be broadly construed.

The LLD 102 may comprise, for example, a network processor such as a PayloadPlus network processor in the APP300, APP500 or APP750 product family, commercially available from Agere Systems Inc. of Allentown, Pa., U.S.A.

The PLD 104 may comprise one or more devices suitable for providing access termination and aggregation for multiple services, or any other physical layer device of a type known to those skilled in the art.

It is to be appreciated that the invention is not limited to use with any particular type of LLD or PLD. Numerous such devices suitable for use with the present invention are well known to those skilled in the art. The conventional aspects of these devices will therefore not be described in detail herein.

The LLD 102 as shown in FIG. 1 includes a classifier 112, a buffer manager 114 and a traffic manager 116. Such elements may be implemented as otherwise conventional network processor elements of a type known to those skilled in the art. The LLD 102 will also generally include other elements of a type commonly found in a network processor or other type of LLD. For example, LLD 102 will typically include an internal memory, as well as an interface to an external memory. Such memory elements may be utilized for implementing PDU buffer memory, queuing and dispatch buffer memory, etc. The LLD may further include one or more memory controllers, as well as appropriate interface circuitry for interfacing with the PLD 104, the switch fabric 110, and other external devices, such as an associated host processor or other device which communicates with the LLD 102 over a standard bus architecture, e.g., a peripheral component interconnect (PCI) bus. The LLD may also include a scheduler, queuing and dispatch logic, as well as other conventional elements not explicitly shown. The operation of these and other conventional elements, being well understood by those skilled in the art, is not described in detail herein.

The PLD 104 may comprise a plurality of queues, including ingress queues and egress queues, as well as appropriate interface hardware for interfacing with the LLD 102 and the transceiver 106. In other embodiments, the transceiver 106 may be implemented within the PLD itself, such that the PLD interfaces directly with the network 108.

It is also possible that the LLD and the PLD may be integrated together into a single device, such as an ASIC. The terms LLD and PLD as used herein should therefore be understood to include any set of one or more functional components which perform respective LLD and PLD operations in a single device.

It should also be noted that the particular arrangement of system elements shown in FIG. 1 is by way of illustrative example only. More particularly, the invention can be implemented in any type of system having at least one LLD and at least one PLD, and is not limited to the particular processing applications described herein. The system 100 may include other elements in addition to or in place of those specifically shown, including one or more elements of a type commonly found in a conventional implementation of such a system.

The port addressing techniques of the present invention as described herein may be implemented at least in part in the form of software program code. For example, these techniques may be implemented at least in part utilizing LLD or PLD elements that are programmable via instructions or other software.

A number of assumptions will be made in describing the illustrative embodiments of the invention below in conjunction with FIGS. 2 and 3. It should be understood that these and other assumptions made herein are for clarity and simplicity of description only, and should not be construed as limitations of the invention.

One or more of the illustrative embodiments will be assumed to utilize Point-to-Point Protocol (PPP), although other protocols can of course be used.

A channel in the following description will be assumed to refer generally to a logical channel at the DS0 level. Such logical channels are similar to virtual channels (VCs) in the ATM context.

A single physical link may carry a number of logical channels. A link in the illustrative embodiments may be, by way of example, a DS1 link comprising 24 DS0 channels and having a data rate of 1.544 Mbps, or an E1 link comprising 32 DS0 channels and having a data rate of 2.048 Mbps.

The term "egress" refers in the illustrative embodiments to the direction of data transfer from the network 108 to user equipment. The egress direction relative to the PLD 104 is thus the direction of data transfer from the PLD interface with the LLD 102 to the PLD interface with the transceiver 106.

The term "ingress" refers in the illustrative embodiments to the direction of data transfer from user equipment to the network 108. The ingress direction relative to the PLD 104 is thus the direction of data transfer from the PLD interface with the transceiver 106 to the PLD interface with the LLD 102.

Arrows are shown in FIG. 1 adjacent the interface 105 to indicate the respective egress and ingress directions that are assumed in the illustrative embodiments. Of course, other directional assumptions may be used in other embodiments.

The present invention in the illustrative embodiment of FIG. 1 configures the PLD 104 and LLD 102 such that the interface 105 between these elements can support a large number of MPHYs while maintaining compliance with one or more standards and avoiding the above-described problems of conventional interfaces. The illustrative embodiment combines the address information from an otherwise standard interface such as SPI-3 or POS-2 with one or more prepend bytes from the payload and a base logical MPHY in order to address a large number of MPHYs in a bit-efficient way that also supports in-band information. The term "prepend bytes" generally refers to initial bytes of the payload, but other payload bytes may be used in other embodiments. In other words, use of prepend bytes is not a requirement of the invention.

The illustrative embodiment is particularly well suited for use in a multiservice environment in that it presents a "logical" view of the channels associated with the "physical" MPHYs. In this terminology, a logical MPHY is one that may be indirectly addressed without violating the addressing mechanism of the standard(s), while a physical MPHY is one that is addressed strictly according to the mechanism of the standard(s). One advantageous feature of the logical MPHY approach of the illustrative embodiment is the ability to group a number of logical MPHYs according to each service in a multiservice application. Grouping by service simplifies the architecture of the communication system if the logical MPHY addresses or numbers of different services are independent of one another. For example, the creation of a new IP channel is simplified if it can be assigned a logical MPHY number without consulting the MPHY numbers already in use by the ATM service.

The operation of the interface 105 in the illustrative embodiment will be described in greater detail below in conjunction with FIGS. 2 and 3. Although the interface 105 includes both egress and ingress directions, the illustrative embodiment will be described with reference to a single direction, namely the egress direction, for simplicity and clarity of description. It is to be appreciated, however, that the described techniques can be adapted in a straightforward manner for use in the ingress direction in addition to or in place of the egress direction. Thus, a given embodiment of the invention may utilize the disclosed interface for egress direction only, ingress direction only, or both egress and ingress directions.

It will be assumed for the present example that the PLD 104 is configured to support at least 1024 MPHYs. The link layer interface portion of the PLD will be referred to herein as a system interface block (SIB). In the egress direction, the SIB is responsible for interpreting the address information and payload prepend bytes for an MPHY. The SIB uses the address information and payload prepend bytes to determine, for example, an egress queue in PLD memory to which a corresponding data segment should be routed.

Figures 2, 3:
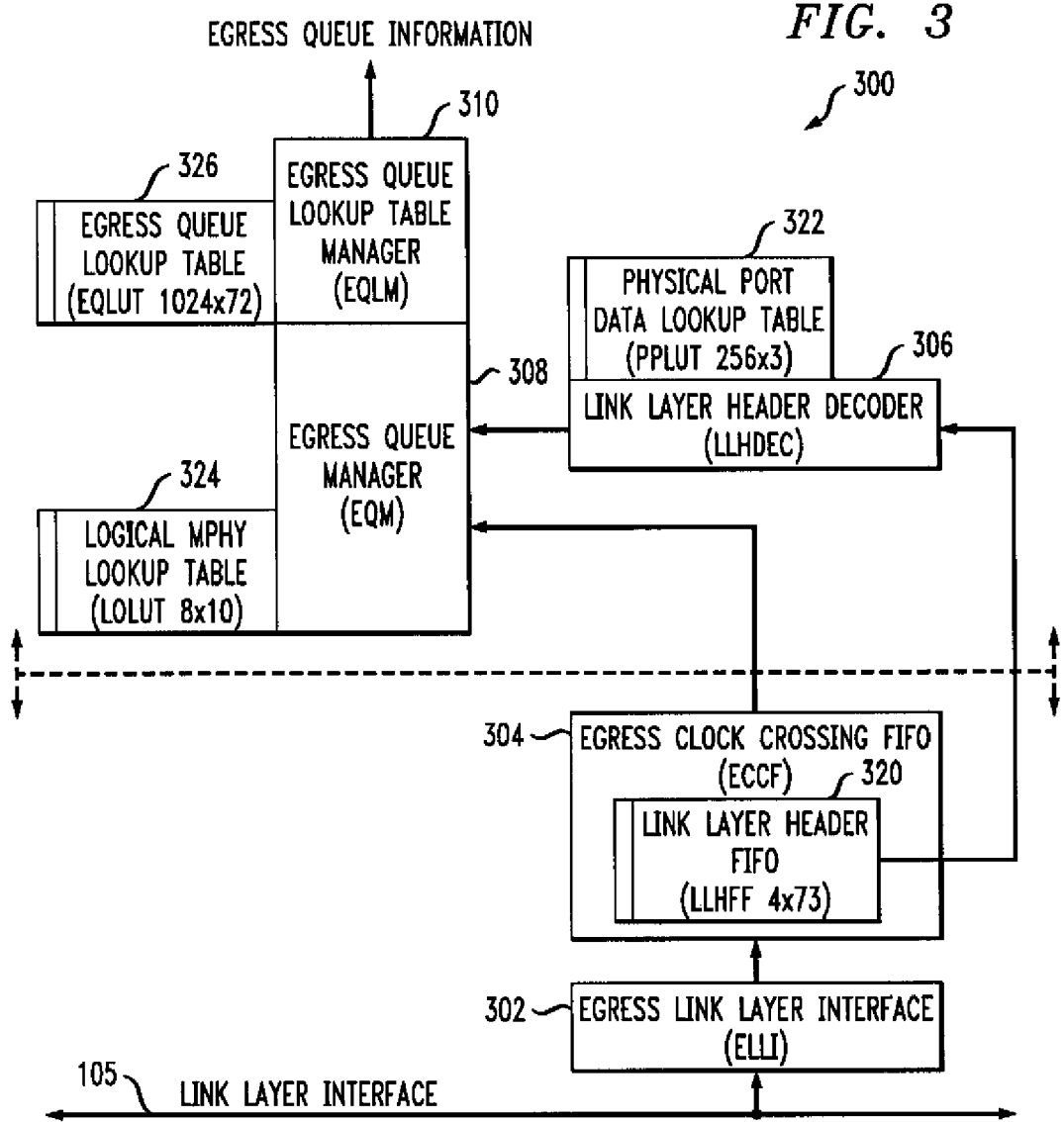
FIG. 2 shows an example of a two-byte prepend format utilized in the FIG. 1 system.
FIG. 3 shows a more detailed view of a portion of an interface between a link layer device and a physical layer device in the FIG. 1 system.

FIG. 2 shows one possible format for the prepend bytes in the illustrative embodiment. The two bytes, denoted in the figure as octets or bytes 0 and 1, are presented in order of their appearance on the interface bus.

Byte 0 of the prepend format appears first on the bus for an 8-bit SPI-3 interface or in the most significant eight bits of the bus for a 16-bit POS-2 interface, while byte 1 appears second on the bus for an 8-bit SPI-3 interface or in the least significant eight bits of the bus for a 16-bit POS-2 interface. Bit 7 of byte 0 indicates whether or not this byte is part of an in-band message sent from the PLD 104 to the LLD 102 in the ingress direction. This message may be used to direct the LLD to change the rate at which it sends traffic or for any other application-specific purpose. Bits 6 to 3 of byte 0 encode the class for a PPP packet, and are otherwise reserved if multi-class PPP is not used. Bits 2 to 0 of byte 0 and all eight bits of byte 1 are referred to herein as the prepend MPHY field. These 11 bits are used, in part, to specify an egress queue for storage of a corresponding packet, cell or other data segment. Since there are 11 bits, up to $2^{11}=2048$ different MPHYs can be supported using this exemplary prepend format.

FIG. 3 shows a more detailed view of a portion of the interface between LLD 102 and PLD 104 in the system 100 of FIG. 1. The circuitry shown in this particular embodiment is link layer interface circuitry 300 that is implemented in the PLD 104. It may be viewed, for example, as comprising a portion of the above-noted SIB. This link layer interface circuitry is configured to translate address and payload information supplied from the LLD via the interface bus of interface 105 in order to find the MPHY attributes used for the corresponding data segment. Such attributes include, as indicated in the figure, information identifying a particular egress queue for the data segment.

It will be assumed for the example of FIG. 3 that 1024 MPHYs are used, rather than the maximum of 2048 that are possible using the 11-bit prepend MPHY field in the prepend format example of FIG. 2. Accordingly, only ten bits of the 11-bit prepend MPHY field are used in this example.

The data flow in this figure begins at the bottom with the link layer interface 105. As noted above, this interface comprises an interface bus of an otherwise conventional SPI-3 or POS-2 interface. The data flow proceeds through an egress link layer interface (ELLI) 302, an egress clock crossing FIFO (ECCF) 304, a link layer header decoder (LLHDEC) 306, an egress queue manager (EQM) 308, and an egress queue lookup table manager (EQLM) 310. The output of this circuitry in the illustrative embodiment is an 8-byte word that specifies egress queue information. This information is used, for example, to route the data segment to its appropriate destination in PLD memory. Such memory is not explicitly shown in the figure for clarity and simplicity of illustration, but can be implemented in a conventional manner well understood by those skilled in the art. Also, it should be appreciated that the PLD may include other conventional circuitry in addition to the link layer interface circuitry 300 shown in the figure.

The dashed horizontal line in the figure denotes the boundary between the link layer clock domain below the line and the internal chip clock domain above the line.

The ELLI 302 connects to the pins of the link layer interface 105. It passes the above-noted address and payload information on to the ECCF 304 to cross from the link layer clock domain of the LLD to the internal chip clock domain of the PLD. This clock crossing is performed in the link layer header FIFO (LLHFF) 320, which illustratively has dimension 4×73, although this and other table dimensions referred to herein are merely examples and can be altered in other embodiments. The input to the LLHFF comprises one byte for the link layer address information, and the first eight bytes of the payload. These nine bytes are collectively referred to as the link layer header. The address information in the first byte of the link layer header comprises the in-band link layer address from the payload in the case of SPI-3, or the separate link layer address in the case of POS-2.

The output of the LLHFF 320 is supplied to the LLHDEC 306. In the LLHDEC, the 8-bit link layer address information is used to address a physical port lookup table (PPLUT) 322 which in this embodiment comprises a 256-entry memory. The dimension of PPLUT 322 is 256×3, as shown. The PPLUT output is a 3-bit value that is used to select an entry containing a 10-bit base logical MPHY indicator in the logical MPHY lookup table (LOLUT) 324, which has dimension 8×10. In addition, the nine bytes from the LLHFF 320 pass through a configurable bit extractor implemented in the LLHDEC 306. The bit extractor may be configured, for example, to select a particular subset of the bits from its 72-bit input, such as any 32 bits. Such bit extractors can be implemented using well-known techniques. The least significant ten bits of the bit extractor output are called the bit extractor logical MPHY, also denoted bitx_lmphy. Typically the bit extractor is configured to select the prepend MPHY field described above in the context of FIG. 2 as bitx_lmphy. In this example, as indicated previously, 1024 MPHYs are supported, and thus only the first 10 bits of the 11-bit prepend MPHY field shown in FIG. 2 are used. The 10-bit bitx_lmphy and the 3-bit PPLUT output are written to decoded link layer header FIFO (DECLLHFF) that is implemented in LLHDEC 306 but not explicitly shown in the figure. The DECLLHFF buffers the bit extracted link layer header. Conventional FIFO buffering techniques may be used for these and other FIFO operations associated with the FIG. 3 embodiment.

The output of the DECLLHFF in LLHDEC 306 is supplied to the EQM 308. In the EQM, the 10-bit bitx_lmphy output of the DECLLHFF is denoted enq_d_lmphy. The 3-bit PPLUT output of the DECLLHFF is denoted enq_d_index. The enq_d_index is used to address the 8-entry LOLUT 324. The LOLUT output is a 10-bit value that is added to enq_d_lmphy and is used to address a 1024-entry egress queue lookup table (EQLUT) 326 associated with the EQLM 310. Each entry of the EQLUT is eight bytes wide and holds attributes of the egress queue such as its service-specific identifier and its base address in memory. Such attributes are an example of what is more generally referred to herein as egress queue information. Each entry may also have additional information associated therewith, such as, for example, an extra eight bits of error correcting code for fault tolerance. Thus, the EQLUT in this particular embodiment is shown as having dimension 1024×72. As indicated previously, other dimensions could be used in other embodiments.

Through the above-described process, the link layer interface circuitry 300 of the PLD 104 enables the LLD 102 to connect to 1024 MPHYs and their associated egress queues without sacrificing compatibility with the standard link layer interface protocols such as SPI-3 and POS-2. The value in the LOLUT entry serves to group physical MPHYs according to a service. This grouping is based on the physical MPHY number through the PPLUT. Thus, the simplified view of logical MPHYs per service is enabled with interleaving MPHYs behavior without requiring interleave state for each of the 1024 egress queues. In addition, the use of an adder to combine the LOLUT output to the enq_d_lmphy permits groups of egress queues to reside anywhere in the EQLUT. The starting entry of a group can be on any address boundary and is not required to be on a power-of-2 boundary. This enables support of multiservice configurations such as 672 IP channels and 84 ATM channels without exceeding the capacity of the EQLUT. Without the adder, such a configuration would require more entries in the EQLUT.

The illustrative embodiment supports many more ports than are possible with the standard protocols and does not require additional interface pins or an excessive amount of memory. In this embodiment, the 2-byte prepend format encodes the extra address information for up to $2^{11}=2048$ MPHYs and still has space to include other in-band information such as class for PPP packets. The prepend format thus advantageously reduces the impact of the additional MPHYs on the bandwidth available for the true payload.

The various lookup tables in the FIG. 3 embodiment may be implemented as separate memory elements, or as different portions of one or more memory elements.

In the illustrative embodiment, the operation used to generate the EQLUT address utilizes a type of base plus offset addressing to determine the egress queue attributes. In addition to the above-noted advantages, this provides enhanced flexibility in the use of the interface. For example, it allows the LLD device to manage a group of egress queues through each link layer port. The LLD can allocate a different link layer port to each service, and can manage multiple egress queues for each service through the corresponding port. In particular, the egress queues through the use of the prepend MPHY field can be numbered independently of the port numbering. As a more specific example, the LLD may designate 672 channels (numbered 0 to 671) for a voice service on link layer port 0, and 352 channels (numbered 0 to 351) for a packet service on link layer port 1. The illustrative embodiment thus advantageously allows the partitioning of MPHYs and their associated egress queue space on non-power-of-2 boundaries.

The prepend format shown in FIG. 2 is the same for both SPI-3 and POS-2. In other embodiments, different prepend formats could be used for respective ones of the standard interfaces. For example, a given prepend format could be optimized for POS-2 to include more in-band information by shortening the prepend MPHY field and shifting this addressing information to the address pins.

Also, the particular number of bytes or bits in the prepend format may be varied in other embodiments. For example, a one-byte prepend format, a three or more byte prepend format, or other formats may be used, depending on the needs of the application. It should be noted that such other formats may include non-prepend formats, such as postpend formats or formats in which the information is distributed rather than at the beginning or end of a header or other portion of a data segment.

In alternative embodiments, other extensions or variations to the datapath could be made. For example, in order to make the EQLUT address generation more flexible, the datapath could use the PPLUT output to select a different bit extractor configuration for each port, instead of using a single bit extractor configuration for all ports as in the illustrative embodiment.

An LLD or PLD in accordance with the invention may be implemented as an integrated circuit device suitable for installation on a line card or port card of a router or switch. Numerous other configurations are possible.

In a given integrated circuit implementation, identical die are typically formed in a repeated pattern on a surface of a semiconductor wafer. Each die includes at least a portion of at least one device as described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Again, the above-described embodiments of the invention are intended to be illustrative only. For example, although illustrated using SPI-3 and POS-2 interfaces, the invention can adapted in a straightforward manner for use with other types of standard or non-standard interfaces. Also, the particular arrangement of link layer device, physical layer device, switch fabric and other elements as shown in FIG. 1 may be varied in alternative embodiments. The link layer circuitry shown in FIG. 3 is merely an example, and may be replaced with other types of memory elements, decoders and other processing elements, in any combination. Furthermore, the particular types of in-band messages, services, protocols, lookup table dimensions and other features used in the illustrative embodiments may be altered to suit the needs of a wide variety of other applications. These and numerous other alternative embodiments within the scope of the following claims will be readily apparent to those skilled in the art.

What is claimed is:

1. A method of processing a data segment received in a physical layer device from a link layer device via an interface bus, the method comprising the steps of:
    determining a port address for the data segment in the physical layer device using a combination of a first address value obtained from a link layer address portion of the data segment and a second address value obtained from a payload portion of the data segment; and
    storing the data segment in a memory location identified by the port address;
    wherein the first address value obtained from the link layer address portion of the data segment comprises a first MPHY address value determined by using a link layer address as an index into a physical port lookup table to obtain an intermediate value, and using the resulting intermediate value as an index into a logical MPHY lookup table to obtain the first MPHY address value: and
    wherein the determining and storing steps are performed by the physical layer device.

2. The method of claim 1 wherein the memory location comprises a particular queue of the physical layer device.

3. The method of claim 2 wherein the determining step further comprises determining egress queue information.

4. The method of claim 3 wherein the egress queue information comprises a plurality of egress queue attributes including at least a service-specific identifier and a base address of the memory location for storing the data segment.

5. The method of claim 1 wherein the link layer address portion of the data segment comprises a portion associated with designated pins of a SPI-3 interface, the designated pins being used to carry part of the payload portion of the data segment when not used to carry a link layer address.

6. The method of claim 1 wherein the link layer address portion of the data segment comprises a link layer address field of a POS-2 interface, the link layer address field being separate from the payload portion of the data segment.

7. The method of claim 1, wherein the payload portion of the data segment comprises one or more prepend bytes including a prepend MPHY field.

8. The method of claim 7 wherein the prepend MPHY field comprises 11 bits so as to support addressing for up to 2048 different MPHYs.

9. The method of claim 7 wherein the one or more prepend bytes further comprise in-band message information.

10. The method of claim 9 wherein the in-band message information comprises information identifying a service class for a designated communication protocol.

11. The method of claim 1 wherein the second address value obtained from the payload portion of the data segment comprises a second MPHY address value that is extracted from the payload portion using a bit extractor.

12. The method of claim 1 wherein the port address is determined by adding the first address value to the second address value and using the resulting combined address value as an index into a queue information lookup table.

13. The method of claim 1 wherein a single bit extractor format is used for each of a plurality of different ports of the physical layer device.

14. The method of claim 1 wherein different bit extractor formats are used for respective ones of a plurality of ports of the physical layer device.

15. The method of claim 1 wherein multiple egress queues are managed through a single physical port.

16. The method of claim 1 wherein multiple egress queues are managed for each of a plurality of services through respective ones of a plurality of ports with numbering of the egress queues being independent of numbering of the ports.

17. The method of claim 1 wherein MPHYs of the physical layer device are partitioned among multiple services on non-power-of-2 boundaries.

18. The method of claim 17 wherein interleaving of MPHYs is supported without requiring storage of interleave state information for each of the MPHYs.

19. An apparatus comprising:
    a physical layer device configured for communication with a link layer device via an interface bus, the physical layer device being operative to determine a port address for a data segment received from the link layer device using a combination of a first address value obtained from a link layer address portion of the data segment and a second address value obtained from a payload portion of the data segment;
    the physical layer device comprising a memory wherein the data segment is stored in a memory location identified by the port address;
    wherein the first address value obtained from the link layer address portion of the data segment comprises a first MPHY address value determined by using a link layer address as an index into a physical port lookup table to obtain an intermediate value, and using the resulting intermediate value as an index into a logical MPHY lookup table to obtain the first MPHY address value.

20. The apparatus of claim 19 wherein the physical layer device is implemented as an integrated circuit.

21. A communication system comprising:
    a link layer device; and
    a physical layer device;
    the link layer device and the physical layer device being coupled together via an interface bus;
    the physical layer device being configured to determine a port address for a data segment received from the link layer device, wherein the port address is determined using a combination of a first address value obtained from a link layer address portion of the data segment and a second address value obtained from a payload portion of the data segment, the physical layer device comprising a memory wherein the data segment is stored in a memory location identified by the port address;

wherein the first address value obtained from the link layer address portion of the data segment comprises a first MPHY address value determined by using a link layer address as an index into a physical port lookup table to obtain an intermediate value, and using the resulting intermediate value as an index into a logical MPHY lookup table to obtain the first MPHY address value.

22. The system of claim 21 wherein the second address value obtained from the payload portion of the data segment comprises a second MPHY address value that is extracted from the payload portion using a bit extractor.

23. The system of claim 21 wherein the port address is determined by adding the first address value to the second address value and using the resulting combined address value as an index into a queue information lookup table.

* * * * *

UNITED STATES PATENT AND TRADEMARK OFFICE
CERTIFICATE OF CORRECTION

| | | |
|---|---|---|
| PATENT NO. | : 7,675,913 B2 | |
| APPLICATION NO. | : 11/466858 | |
| DATED | : March 9, 2010 | |
| INVENTOR(S) | : A. P. Henry et al. | |

It is certified that error appears in the above-identified patent and that said Letters Patent is hereby corrected as shown below:

In the claims:

Col. 11, line 29, please delete "laver" and insert therefor --layer--.

Signed and Sealed this

Fourth Day of May, 2010

David J. Kappos
*Director of the United States Patent and Trademark Office*